United States Patent [19]
Colleran et al.

[11] Patent Number: 6,005,575
[45] Date of Patent: Dec. 21, 1999

[54] FOREGROUND WINDOW DETERMINATION THROUGH PROCESS AND THREAD INITIALIZATION

[75] Inventors: John D. Colleran; Gerardo Bermudez, both of Redmond, Wash.

[73] Assignee: Microsoft Corporation, Redmond, Wash.

[21] Appl. No.: 09/046,496

[22] Filed: Mar. 23, 1998

[51] Int. Cl.$^6$ ........................................ G06F 3/00
[52] U.S. Cl. .................... 345/344; 345/342; 709/100
[58] Field of Search .................... 345/340, 343, 345/345, 342, 114, 344; 709/201, 205, 215, 223, 240, 249, 225, 100, 101, 102, 103, 104, 105, 106, 107, 108

[56] References Cited

U.S. PATENT DOCUMENTS

| | | | |
|---|---|---|---|
| 5,075,675 | 12/1991 | Barker et al. | 345/340 |
| 5,193,186 | 3/1993 | Tamaki et al. | 395/676 |
| 5,371,746 | 12/1994 | Yamashita et al. | 364/285.2 |
| 5,603,053 | 2/1997 | Gough et al. | 710/5 |
| 5,632,032 | 5/1997 | Ault et al. | 395/670 |
| 5,767,850 | 6/1998 | Ramanathan et al. | 345/345 |
| 5,838,321 | 11/1998 | Wolf | 345/343 |

*Primary Examiner*—John E. Breene
*Assistant Examiner*—Tadesse Hailu
*Attorney, Agent, or Firm*—Christensen O'Connor Johnson & Kindness PLLC

[57] ABSTRACT

A method, system and computer program product for foreground window determination of windows displaying applications in a displayed desktop. The present invention continuously resolves the issue of what program or process running or to be run in a window on the desktop is displayed in the foreground or focus window, thereby avoiding unintentional inputs to an application in a background window and unintentional switching of the application program presented in the foreground window of a windows-based operating system. The continuous resolution is made by determining if an initiated process has the special right for its window to become the foreground window; determining if the window associated with a process can take the foreground based on a set of predetermined process foreground rules and if the right was given with respect to the initiated process; determining if an initiated thread has the special right for its window to become the foreground window; and determining what window displayed or to be displayed is in the foreground when a thread requests for its associated window to take the foreground based on a set of predetermined thread foreground rules and if the right was given with respect to the initiated thread.

11 Claims, 8 Drawing Sheets

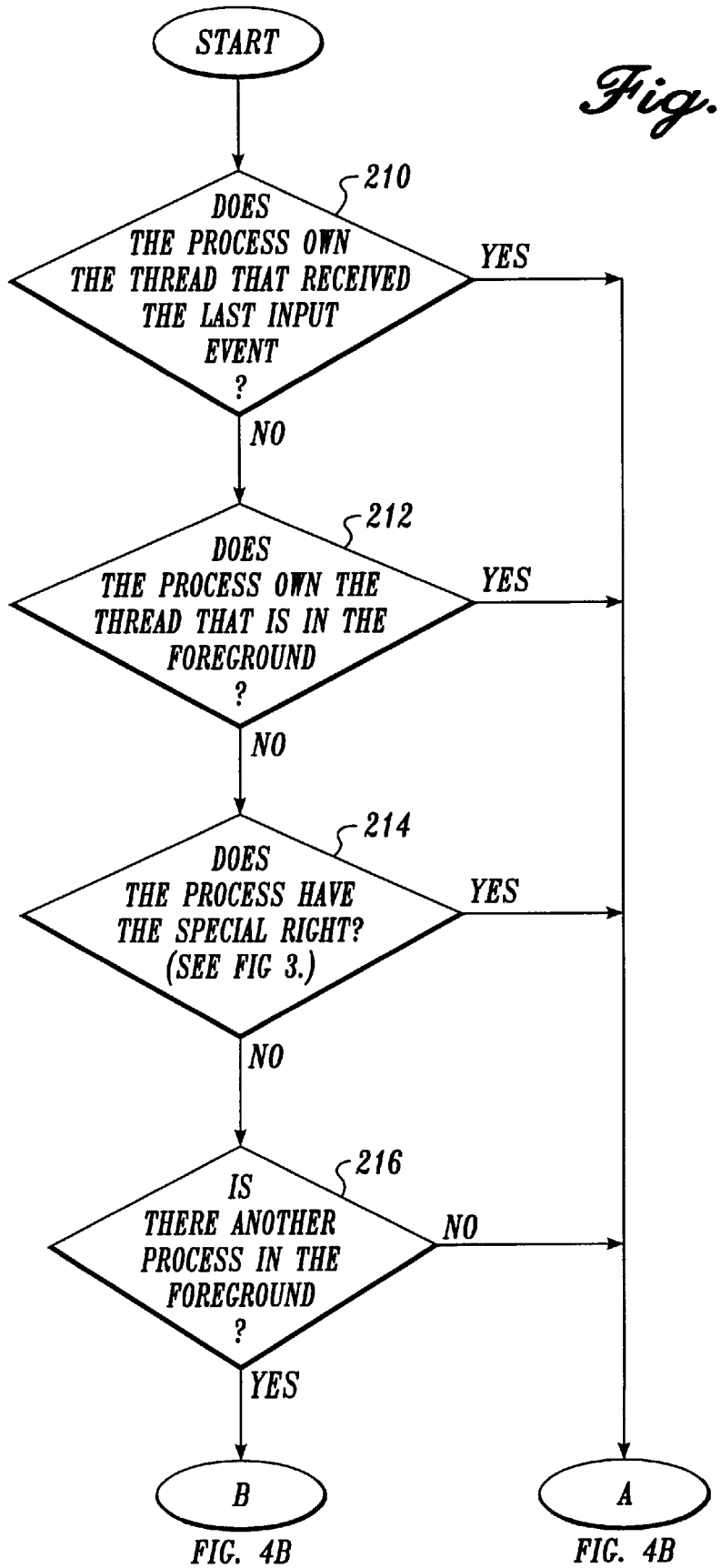

1

FOREGROUND WINDOW DETERMINATION THROUGH PROCESS AND THREAD INITIALIZATION

FIELD OF THE INVENTION

This invention relates to methods, systems and computer products for controlling computer interaction and, more particularly, methods, systems and computer products for more effectively determining interaction with an operating system during manual and automatic application activation.

BACKGROUND OF THE INVENTION

As will be better understood from the following description, the present invention was developed to provide more positive interaction with an operating system by avoiding unintentional switching of the foreground window of a windows-based operating system, which can cause inputs to be unintentionally sent to the wrong application program.

It is now common for operating systems to have a shell which provides a graphical user interface (GUI). The shell is a piece of software (either a separate program or component part of the operating system) that provides direct communication between the user and the operating system. The GUI typically provides a graphical icon-oriented and/or menu driven environment for the user to interact with the operating system.

The GUI of many operating system shells is based on a desktop metaphor. More specifically, the GUI is intended to create a graphical environment which simulates working at a desk. These GUIs typically employ a windowing environment with a desktop. The windowing environment presents the user with specially delineated areas of the screen called windows, each of which is dedicated to a particular application program. Application programs or processes presented in a window include sub-processes or threads that are displayed in separate windows. Each window can act independently, as if it were a virtual display device under control of its particular process or thread.

Windows can typically be resized, moved around the display, and stacked so as to overlay one another. In some windowing environments, windows can be minimized to an icon or increased to a full-screen display. Usually, the windows have a top to bottom order in which they are displayed, with top windows at a particular location on the screen overlaying any other window at that same location. The top-most window is the "focus" or "foreground" window and the process or thread associated with the focus window responds to the users'input. The user can switch other windows to the top by clicking with a mouse or other pointer device, or by inputting certain key combinations. This allows the user to work with multiple application programs in a manner similar to physically working with multiple paper documents and items, which can be arbitrarily stacked or arranged on an actual desk.

In present windowing environments, if a user is typing when a focus or foreground window change takes place, the user can, unintentionally, send keyboard input to a process or thread associated with the new foreground window. This may generate an unwanted action by the process or thread associated with the new foreground window and delay the user's completion of tasks related to the process or thread associated with the previous focus or foreground window. This typically happens when a process, other than the one the user is typing to, creates a thread that generates a message to be displayed in a message box or alert window and the thread requests the operating system to allow the message box window to take the foreground window position. When the operating system allows the foreground window request, the message box window takes the foreground window position and user interface actions, such as typing, are directed to the thread associated with the "new" foreground window. Such input (meant to go to the process or thread associated with the previous foreground window) might reply and perhaps dismiss the message box window before the user reads the message in the message box window, and sometimes even before the user sees the message box window at all. The result is a delay in the user interaction with the process or thread in the previous foreground window or the missing of meetings or other important activities because the associated notification was not properly received.

The present invention is directed to overcoming the foregoing and other disadvantages. More specifically, the present invention is directed to providing a method, system and computer product for effectively controlling the interaction of applications in a windows-based operating system.

SUMMARY OF THE INVENTION

In accordance with this invention, a method, system and computer program product for determining the foreground window of windows of application programs or processes to be displayed on a desktop is provided. The present invention continuously resolves the issue of what program or process running or to be run in a window on the desktop is to respond to user input and, thus, which program or process window is to be the foreground or focus window. The continuous resolution is made by determining if an initiated process has the special right for its window to become the foreground window; determining if the window associated with a process can take the foreground based on a set of predetermined process foreground rules and if the right was given with respect to the initiated process; determining if an initiated thread has the special right for its window to become the foreground window, and determining what window displayed or to be displayed is in the foreground when a thread requests for its associated window to take the foreground based on a set of predetermined thread foreground rules and if the right was given with respect to the initiated thread.

In accordance with other aspects of the present invention, the determination if an initiated process has the right for its window to become the foreground window is positive if no input has been generated for another process during initialization of the initiated process; and the window associated with the process that created the initiated process or any process in a chain of parent processes from the initiated process can take the foreground based on predetermined process foreground rules.

In accordance with still other aspects of the present invention, the window associated with a process can take the foreground based on the predetermined process foreground rules if. the process owns the thread that received the last input; the process owns the thread that is associated with the window that is in the foreground; the special right has been granted with respect to the process; no window associated with another process is in the foreground; or if a window associated with another process is in the foreground, the process that received the last input is being debugged, the process in the foreground is being debugged, or a preset time-out limit has expired for the process in the foreground.

In accordance with yet other aspects of the present invention, the determination if an initiated thread has the right for its window to become the foreground window is positive if: the right was not granted with respect to the thread's process; and the window associated with the thread's process is in the foreground or the thread's process received the last input.

In accordance with still yet other aspects of the present invention, the predetermined thread foreground rules allow the window associated with a thread to take the foreground if: there are no windows associated with threads in the menu mode; and the thread is a system thread, the special right was granted with respect to the thread or the window associated with the thread's process can take the foreground.

As will be readily appreciated from the foregoing summary, the invention provides a new and improved method, system and computer program product for providing more positive interaction with an operating system by avoiding unintentional inputs to an application associated with a background window and unintentional switching of the application program associated with the foreground window of a windows-based operating system.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
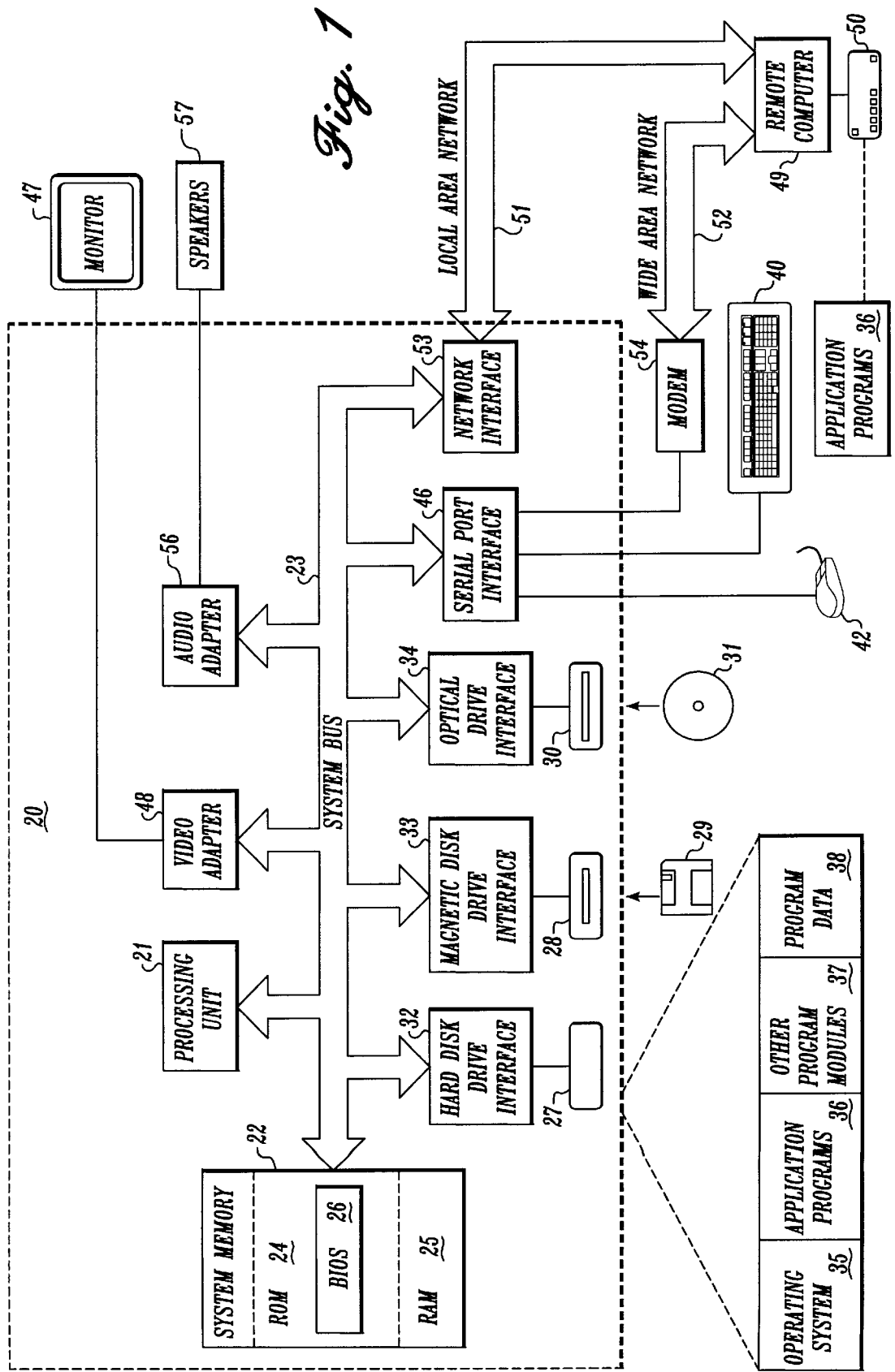
FIG. 1 is a block diagram of a general purpose computer system for implementing the present invention.

In accordance with the present invention, a windows foreground determination program formed in accordance with this invention executes on a computer, preferably a general purpose personal computer, that may or may not be networked to other computers, including servers. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing a removable magnetic disk 29, and an optical disk drive 30 for reading from or writing to a removable optical disk drive 30, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 may also be connected to the system bus 23 via an interface, such as an audio adapter 56. In addition to the monitor and speakers, personal computers typically include other peripheral output devices (not shown), such as printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention, implemented on the system described in FIG. 1, provides a method for continually determining what process has control of the operating system 35, which is windows based. What process has control is determined by determining which window is the foreground or focus window of multiple windows displayed or displayable on the monitor 47 based on a set of rules. The method of the present invention is performed by computer program instructions in the form of functions or components processed by processing unit 21 and stored in system memory 22 or accessed through an interface 32, 33, 34, 46, 53.

Application programs provide interactive functions of a particular type. As well known to those familiar with windows based operating systems, users usually interact with application programs running on a windows based operating system via windows "displayed" on a desktop. Application programs are hereinafter referred to as processes. Each process includes one or more sub-process or thread. In accordance with the present invention, threads generate the images that appear in a window separate from the window associated with the thread's process or that appear as part of the window associated with the thread's process. An example of a process is a word processing application program. Some of the threads of a word processing program are the display area and the button bar.

Also it can be appreciated that if a process includes only one thread, that thread owns the window. Additional threads of a process can generate images for windows that are separate from other thread's windows or that appear as part of other thread's windows.

When a process with thread(s) is started manually by a user, a thread of the started process requests for its associated window to take the foreground. Also, if a thread is started automatically by an existing process, the started thread requests for its associated window to take the foreground. In accordance with this invention, these requests for taking the foreground are analyzed by the operating system against a predetermined set of rules. The set of rules relate to what else is presently occurring on the desktop and whether the started or initiated process and thread were granted a special right for their associated windows to take the foreground. The set of rules and when the rules are analyzed provide a technique that efficiently determines when to allow windows associated with processes or threads to take the foreground position, thereby avoiding unintentional inputs to a process associated with another window displayed on the desktop.

At process and thread initialization, the operating system assigns initial values to variables and data structures to prepare for process and thread execution. Process initialization begins when the process is activated manually by user interaction or automatically by another process. Thread initialization begins when the thread is activated manually by user interaction or automatically by the process that owns the thread. The process and thread initialization completion times are very short ($\mu$sec) as compared to the period of time (sec) from the end of initialization to window creation for presenting any initialized threads. The first point in time that a user can interact with a process is after the window associated with one or more of its threads has been created and the operating system has determined that the created window is to take the foreground position on the desktop. Because other manual or automatic operations may occur during process or thread initialization or during window creation, window foreground rules determination occurs before and after initialization.

Figure 2:
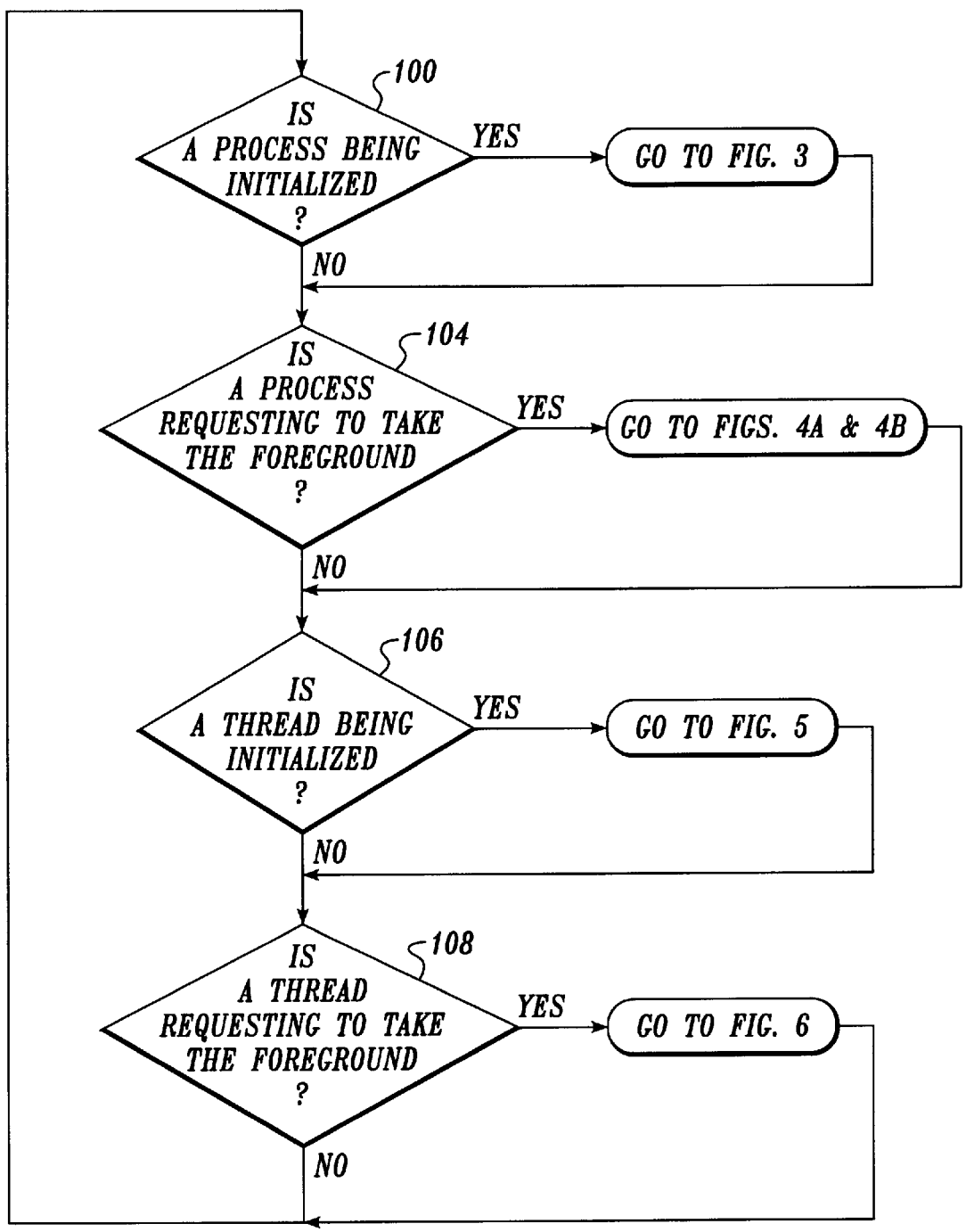
FIGS. 2–6 are flow diagrams illustrating the method of window foreground determination.
Figure 3:
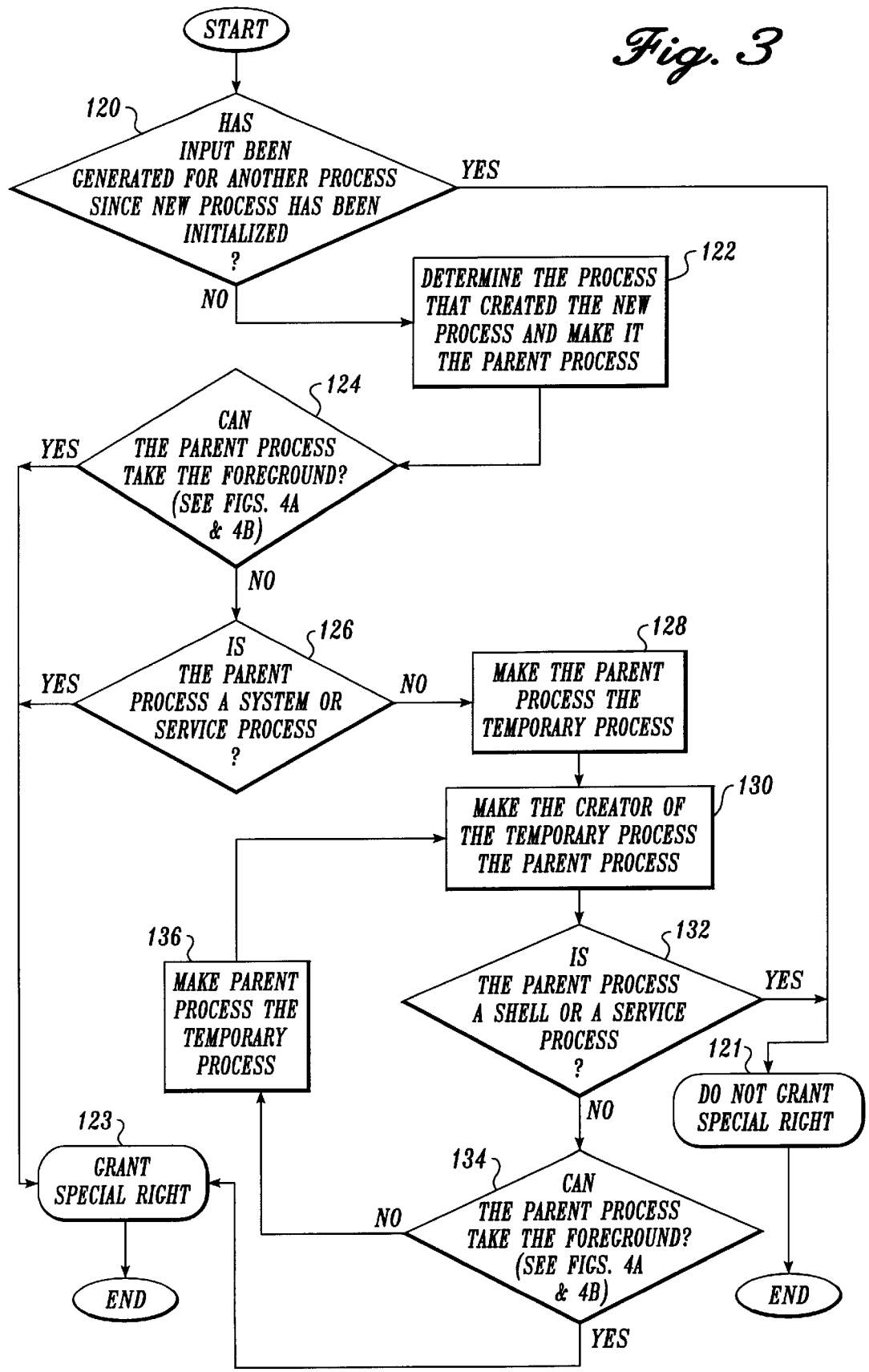
Figure 4B:
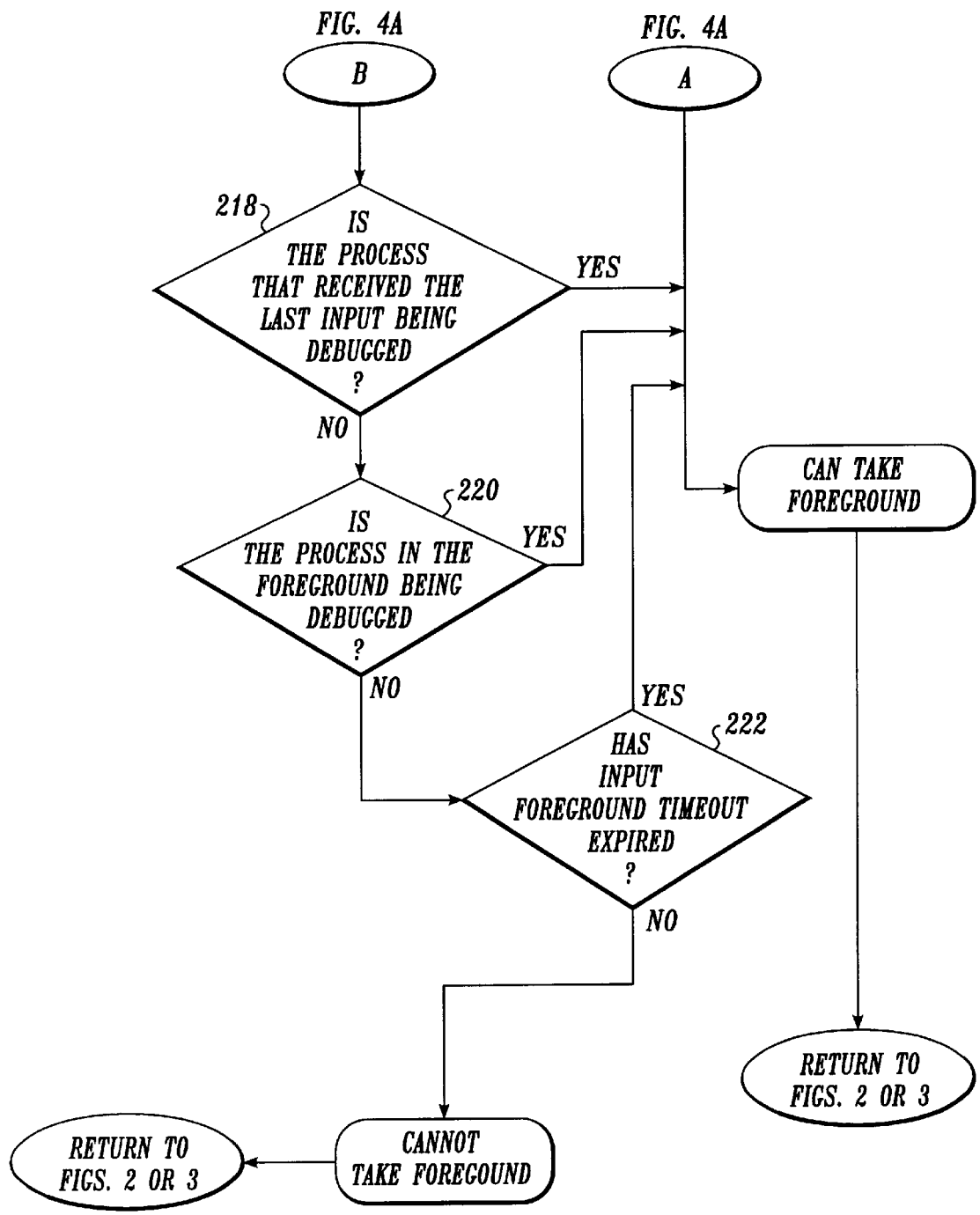

As shown in FIG. 2, foreground window determinations and the rules for these determinations are continuously being performed by the operating system. If a process is being initialized as determined in decision block 100, the operating system determines whether the process is granted a special right for its associated window to take the foreground. The process special right determination is only made once, at initialization. The process special right determination is illustrated in FIG. 3 and described in more detail below. As shown in decision block 104, the operating system determines if the window associated with a process can take the foreground. The request depicted by decision block 104 may occur multiple times for a single user input, for example, after the process has completed the initialization process caused by user activation of an icon corresponding to the process, or when the window associated with the process is on the desktop but not in the foreground and a manual or automatic selection of that window is performed. Determination of whether a process can have its associated window take the foreground is illustrated in FIGS. 4A and 4B and described in more detail below.

Figure 5:
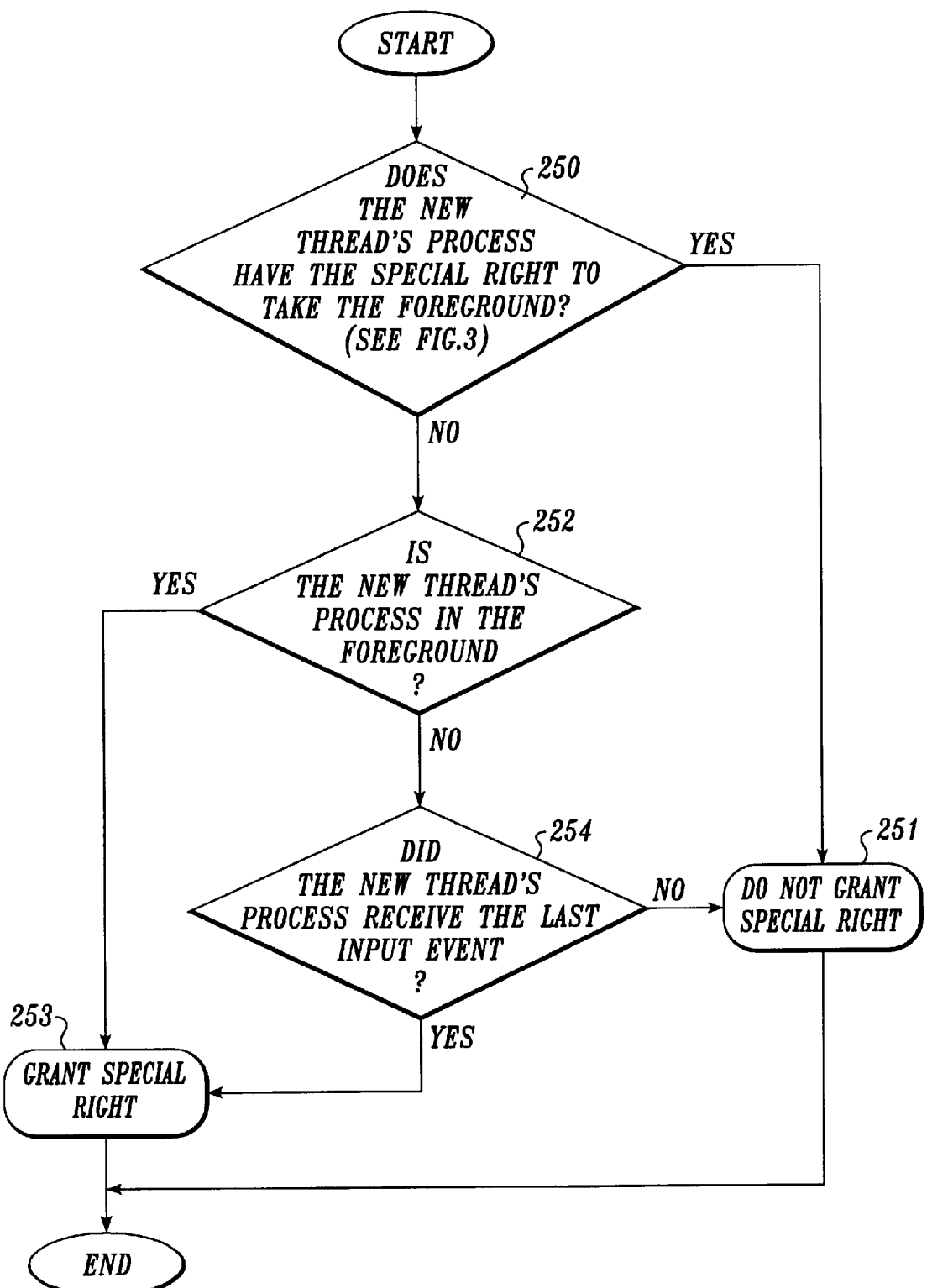
Figure 6:
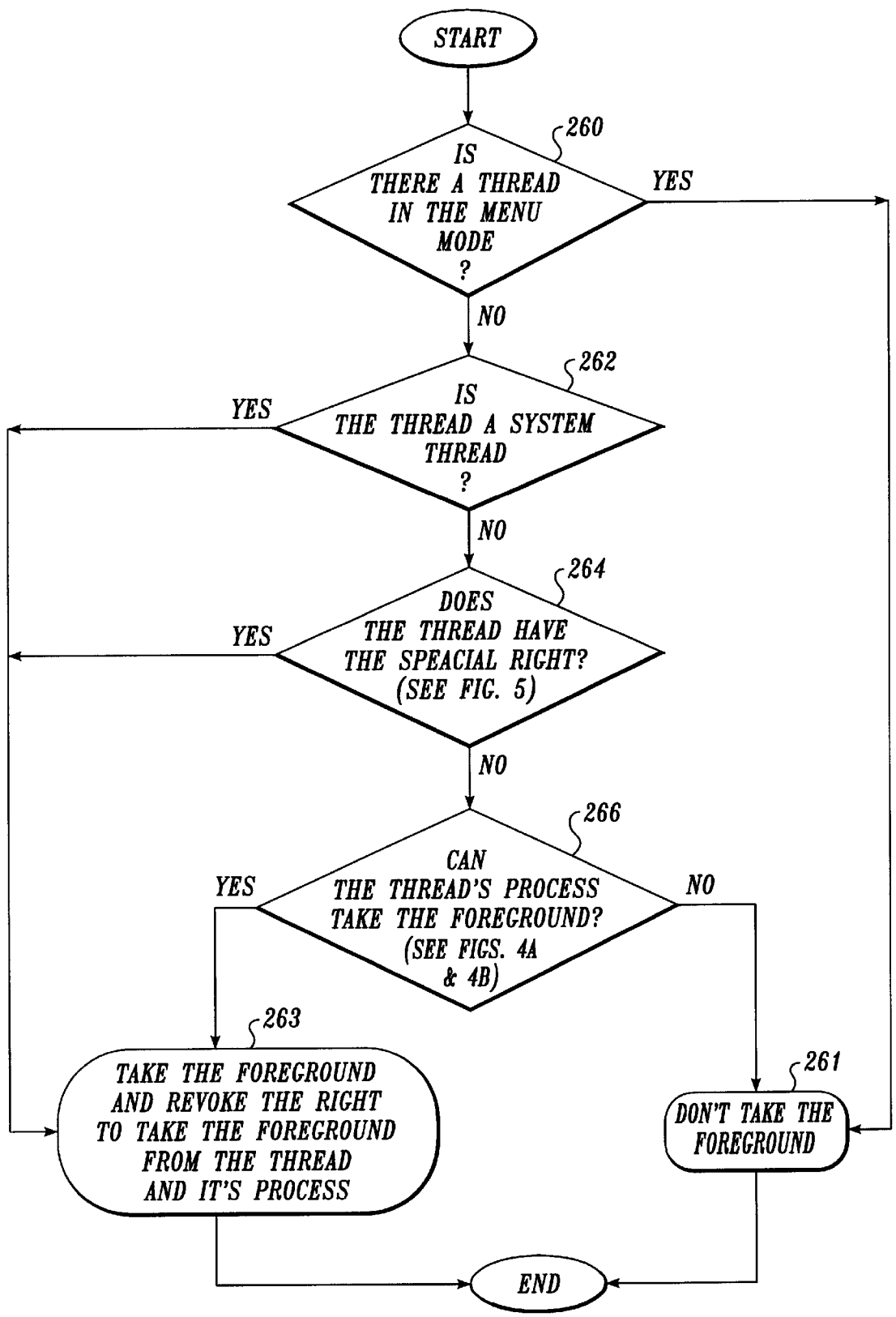

If a thread is being initialized, as shown in decision block 106, the operating system determines if the initializing thread is to be granted a special right that allows its associated window to take the foreground. As with the process special right determination, the determination of whether a thread is to be granted a special right is made once, at initialization. The special right determination of a thread is illustrated in FIG. 5 and described in more detail below. Thread foreground window requests may also occur multiple times; for example, after the thread has completed the initialization process caused by initiation of the thread's process, or when the window associated with the thread is on the desktop but not in the foreground and a manual or automatic selection of the thread's window is performed. Determination of whether a thread request can cause its associated window to take the foreground is illustrated in FIG. 6 and described in more detail below.

As will be readily appreciated by those of ordinary skill in the art of windows interfacing, the determinations shown in FIG. 2 are not necessarily performed in the order in which they are shown, but in fact are performed based on what automatic or manual actions are presently occurring on the desktop.

FIG. 3 illustrates the special right determination performed during process initialization. First, at decision block 120, during process initialization a test is made to determine whether input has been generated for another process associated with another window is performed. If input has been generated for a process associated with another window, the special right to take the foreground for the window associated with the process being initialized is not granted. See block 121. If no input has been generated for a process associated with another window, the process that created the newly initialized process is determined and the determined creator process is made the parent process. See block 122. The parent process is an identifier used for analyzing a process and its relationship to processes that created it. Then, at decision block 124, the operating system determines whether the window associated with the parent process can take the foreground. In other words, if a thread of parent process was to request the foreground, would its associated window be allowed to take the foreground. This determination is illustrated in FIGS. 4A and 4B and described in more detail below. If the window associated with the process stored as the parent process can take the foreground, the window associated with the newly initialized process is granted the special right to take the foreground. See block 123. However, if the parent process cannot take the foreground, the operating system determines if the parent process is a system (hereinafter service) process. See decision block 126. A service process performs a specific system function and often provides an application programming interface (API) for other processes to call. For example, a printer spooler is a service process. If the parent process is a service process, the window associated with the newly initialized process is granted the special right to take the foreground. Again see block 123. If the parent process is not a service process, the parent process of the newly initialized process is assigned as the temporary process. See block 128. Then, as shown in block 130, the creator of the temporary process is made the parent process. Next, at decision block 132, a determination of whether the parent process is a shell or service process is performed. A shell process is the root process that allows a user to interact with the operating system. For example, command interface process COMMAND. COM is a shell process. If the parent process is not a shell or service process, at decision block 134 a determination of whether the window, associated with the parent process, can take the foreground is performed. Again, determination of whether a process can have its associated window take the foreground is illustrated in FIGS. 4A and 4B and described in more detail below. If the parent process cannot take the foreground, the parent process becomes the temporary process as shown in block 136 and returns to block 130, thus making the creator of the temporary process the parent process. If, at decision block 134, the window associated with the parent process was determined that it can take the foreground, the window associated with the newly initiated process is granted the special right to take the foreground (block 123). The loop created by blocks 130–136 steps through the parents, grandparents, etc., processes of the newly initialized process until a parent process that is a shell or service process is found or until a process that can take the foreground is found. In the special case when a process installs a journal playback hook, the process receives a permanent right to take the foreground, thereby nullifying other granted special rights.

FIGS. 4A and 4B illustrate the steps performed in the decision blocks 124 and 134 of FIG. 3 and when a thread of a process requests to take the foreground, as shown in decision block 104 of FIG. 2. First, at block 210, a determination of whether the process owns the thread that received the last input is made. The process referred to is the process presently identified as the parent process or the process that owns the thread requesting to take the foreground. If the process owns the thread that received the last input, the window associated with that process can take the foreground. See FIG. 4B. If at decision block 210, the process does not own the thread that received the last input, a determination of whether the process owns the thread that is presently in the foreground is made. See decision block 212. If the process does own the thread that is in the foreground, the window associated with that process can take the foreground. However, if the process does not own the thread that is in the foreground, a determination of whether the process still maintains the special right for its associated window to take the foreground is made. See decision block 214. As shown in FIG. 3 and described above, the special right determination is performed once for each process, at initialization. If the window associated with the process has the special right to take the foreground, the window associated with that process can take the foreground. However, if its window does not have the special right to take the foreground, a test is made to determine if another process is in the foreground. See decision block 216. If no other process is in the foreground, the window associated with that process can take the foreground. However, if there is a process in another window that is in the foreground, checks for process debugging are performed in decision blocks 218 and 220, shown in FIG. 4B and described below.

As shown in FIG. 4B, at decision block 218, if a process received the last input and is presently being debugged, the window associated with the process being checked can take the foreground. However, if the process other than the requesting process that received the last input is not being debugged, a determination of whether the process in the foreground is being debugged is performed. See decision block 220. If the process in the foreground window is being debugged, the window associated with the process being checked can take the foreground. However, if the process in the foreground window is not being debugged, a determination of whether the input foreground time-out has expired is performed. See decision block 222. Input foreground time-out refers to the amount of time since the last input to the thread of the process that is associated with the foreground window. The length of time for input foreground time-out may be preset by a user during system configuration. If the time-out has expired, the window associated with the process being checked can take the foreground. If the time-out has not expired, the window associated with the process being checked can not take the foreground.

Referring back to FIG. 2, as noted above, at decision block 106, if a thread is being initialized, the steps in FIG. 5 are performed. First, at decision block 250, a determination of whether the window associated with new thread's process has been granted the special right to take the foreground is performed. As illustrated in FIG. 3 and described above, a decision regarding granting the process special right was made during process initialization. If the window associated with the thread's process was granted the special right to take the foreground, the thread special right is not granted (block 251), since the threads process already received the special right. If the window associated with the thread's process does not have the special right to take the foreground, a test is made to determine if the window associated with the new thread's process is in the foreground. See decision block 252. If the window associated with the new thread's process is in the foreground, the special right is granted to the window associated with the thread. See block 253. If the window associated with the new thread's process is not in the foreground, a determination of whether the window associated with the new thread's process received the last input is made. See decision block 254,. If the window associated with the thread's process did not receive the last input, the special right is not granted (block 251). If the window associated with the new thread's process did receive the last input, the special right is granted (block 253).

After the completion of thread initialization or when a previously running thread requests that its associated window to take the foreground, the steps in FIG. 6 are performed. First, at block 260, a determination of whether another thread is in the menu mode is made. If there is another thread in the menu mode, the window associated with thread requesting to take the foreground does not take the foreground. See block 261. If there are not any threads in the menu mode, a test is made to determine if the requesting thread is a system thread. See decision block 262. If the thread is a system thread, the window associated with the thread takes the foreground. See block 263. A system thread is a thread owned by a system process. However, if the thread is not a system thread, a test is made to determine of whether the thread was granted the special right for its associated window to take the foreground is performed. See decision block 264. If the special right was granted, the window associated with the thread takes the foreground. However, if the special right was not granted, a test is made to determine if the thread's process can take the foreground. See decision block 266. The steps that perform the determination in decision block 266 are illustrated in FIGS. 4A and 4B and described above. If the determination determines that the thread's process cannot take the foreground, the window associated with the requesting thread does not become the foreground window (block 261). If the thread's process can take the foreground, the window associated with the thread takes the foreground (block 263). When a window associated with the thread takes the foreground, the special rights associated with the thread and the thread's process are revoked.

As can be readily appreciated by those of ordinary skill in the art of windows-based operating systems, the events listed and described in FIGS. 2–6 may occur simultaneously or in any order, because the special right and foreground window determinations are continuously being performed relative to actions and occurrences that are automatically or manually occurring with and between processes and threads within windows.

Figure 7:
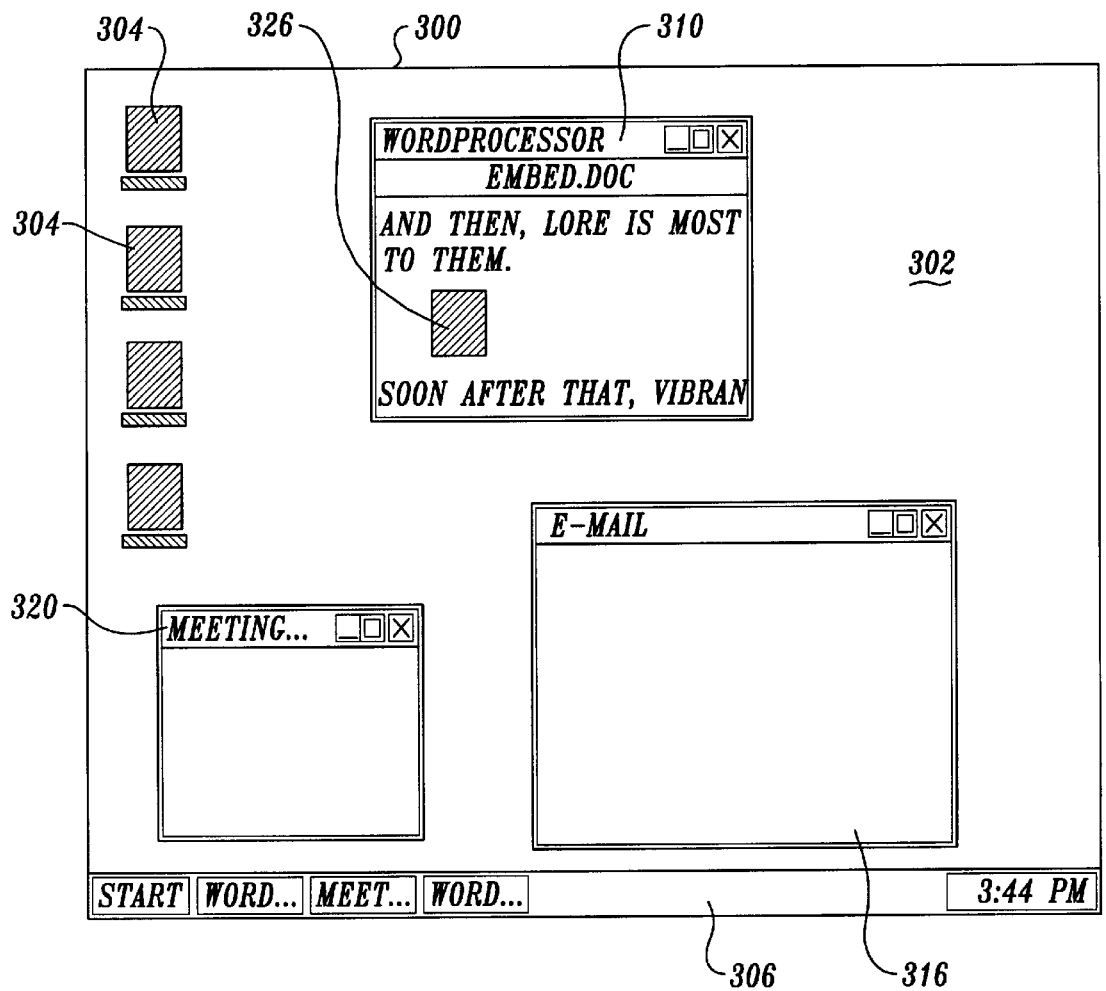
FIG. 7 is an example screen shot of a desktop operating in accordance with the process illustrated in FIGS. 2–6.

A special API, AllowSetForegroundWinmdow (dwProcessId), that identifies a background process is used by the process associated with the foreground window to allow the identified background process to take the foreground. According to this API, the identified background process is made the owner of the last input event, thus giving the background process the right for its window to take the foreground. FIG. 7 illustrates a screen shot of a windows-based desktop and is used to illustrate a few examples of the method described above in FIGS. 2–6. The examples illustrated and described include the initialization of a new process and thread, and a thread foreground request for its associated window. The examples are for illustrative purposes only. The example screen shot 300 of FIG. 7 includes a desktop 302 that spans the width and height of the display. The desktop 302 includes icons 304 that are linked to application programs or processes stored in the system's memory, and a task bar 306 that allows quick access to various application programs or processes stored in various locations in the system's memory or actively running on the desktop 302. Also shown on desktop 302 are windows that display threads of specific processes that were automatically or manually initiated.

The first example illustrates foreground determination for the window associated with a display thread of a word processing process. The thread is displayed in window 310. When the word processing process is activated by a user activating its corresponding icon displayed in the display 302 and no input has been generated by the user for another process associated with another window on the desktop area 302, the system determines if the window associated with the parent process of the initiated word processing process can take the foreground. In this example, the parent process is a shell process that received the last input and therefore its associated window can take the foreground, therefore, the special right is granted. After initiation is complete, a thread owned by the word processing process requests that its associated window to take the foreground. Since the special right was granted with respect to the word processing process, the window associated with the thread takes the foreground.

In the next example, input was generated for another process before the word processing process became fully initialized. If the generated input was the activation of a menu in the e-mail program displayed in window 316, the window associated with a thread owned by word processing process will not take the foreground. However, because in this example no menu is displayed in any other window on the desktop 302, and no special right was granted with respect to the word processing process, but input was generated to another process prior to word processing process being initialized, the system determines if there is a window associated another process and its threads presently in the foreground when the system determines if the window associated with the word processing process can take the foreground. Since the e-mail process is associated with the window in the foreground and time-out has expired, the window associated with the word processing process can take the foreground.

The following examples are examples of thread initialization and thread foreground window requests. When a thread owned by the word processing process makes a request for its associated window to be displayed in the foreground, the operating system determines if another thread in any other process is in the menu mode, if the thread requesting to take the foreground is a system thread, and if the thread requesting the foreground has the special right. In this example the answers to these three questions are no, and the thread's process (word processing process) was able to take the foreground. Therefore, the window associated with the requesting thread takes the foreground.

Threads in the following examples are automatically generated by a process and generate reminder box or alert-type windows. Threads of this type are automatically activated by already running processes. Wmdow 320 is associated with a thread of a reminder box that reminds the user of a meeting time and place. The reminder box information was prestored using the e-mail process displayed in window 316. In the first example, a new thread, reminder box thread, is initiated by the e-mail process associated with window 316. At initialization of the reminder box thread, the operating system determined if the special right is granted with respect to the reminder box thread. Also, in this example, the word processing process is associated with the window that is in the foreground and includes the thread that received the last input. Since the special right was not granted in a prior determination with respect to the reminder box thread's process, the e-mail process, the special right is not granted with respect to the reminder box thread. After reminder box thread initialization, the reminder box thread requests for its associated window to be in the foreground. If it is determined that no window associated with another thread is in the menu mode, the reminder box thread is not a system thread, the special right was not granted with respect to the reminder box thread, and the e-mail process cannot take the foreground, the window associated with reminder box thread does not take the foreground.

The following example is if a new thread is initiated by a user. For example, a print thread (not shown) is created in the word processing process when the user clicks the print button on the associated window's button bar. If the operating system determined that the special right was not granted with respect to the print thread's process, the word processing process, and the window associated with the word processing process is in the foreground, the special right is granted with respect to the print thread during the thread initialization. The print thread then requests for its associated window to take the foreground. If the system determines that there are no other threads in the menu mode and the print thread is not a system thread, the window associated with the print thread will take the foreground, because the special right was granted.

The last example is a process that is initiated in an embedded operation. The word processing process in window 310 includes the embedded process shown by icon 326. Selection or activation of the icon 326 begins the initiation of the process that corresponds to the icon 326. During initiation of the process associated with the icon 326, if no inputs have been generated for another process, the operating system determines if the parent process of the initiated process is a service process. When a linked or embedded feature is activated, OLE™ calls Remote Procedure Call Subsystem (RPCSS). RPCSS is a service process. Since the parent process is a service process, the special right is granted with respect to the initiated process. After the process is initiated, the system determines if the window associated with the process can take the foreground. Because the special right was granted, the process can take the foreground. This determination is used later when a thread owned by the newly initialized process is initialized and makes a request for its associated window to take the foreground.

As can be readily appreciated by those of ordinary skill in the art of application programs, that the above examples were for illustrative purposes only and are in contrast to more popular understandings of threads. Most applications use the same thread to handle all windows related to or contained in the main window of the application. As is most commonly understood, the display area and the button bar of a window belong to the same thread. A typical word processor probably uses additional threads to perform background operations like auto-correct or auto-save. Those additional threads may display windows for prompting the user for information or for presenting some kind of notification.

The result of the foreground determination steps from FIGS. 2–6 is a windowing system that concisely and completely controls user interaction. The present invention keeps a user from applying input to an application in a background window or from unintentionally canceling alert messages.

While the presently preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-based method for determining if a window may become the foreground window on a computer controlled display, said method comprising:

determining if an initiated process has the right for its window to become the foreground window;

determining if the window associated with a process can take the foreground based on a set of predetermined process foreground rules and if the right was given with respect to the initiated process;

determining if an initiated thread has a right for its window to become the foreground window; and determining what window displayed or to be displayed is in the foreground when a thread requests for its associated window to take the foreground based on a set of predetermined thread foreground rules and if the right was given with respect to the initiated thread.

2. The method of claim 1, wherein determining if an initiated process has the right for its window to become the foreground window comprises:

granting the right to the initiated process if:

no input has been generated for another process during initialization of the initiated process; and the window associated with the process that created the initiated process or any process in a chain of parent processes from the initiated process can take the foreground based on predetermined process foreground rules.

3. The method of claim 2, wherein the window associated with a process can take the foreground based on the predetermined process foreground rules if:

the process owns the thread that received the last input;

the process owns the thread that is associated with the window that is in the foreground;

the special right has been granted with respect to the process;

no window associated with another process is in the foreground; or if a window associated with another process is in the foreground, the process that received the last input is being debugged, the process in the foreground is being debugged, or a preset time-out limit has expired for the process in the foreground.

4. The method of claim 3, wherein the determining if an initiated thread has the right for its window to become the foreground window further comprises:

granting the right with respect to a thread if:

the right was not granted with respect to the thread's process; and the window associated with the thread's process is in the foreground or the thread's process received the last input.

5. The method of claim 4, wherein the predetermined thread foreground rules allow the window associated with a thread to take the foreground if:

there are no windows associated with threads in the menu mode; and the thread is a system thread, the special right was granted with respect to the thread or the window associated with the thread's process can take the foreground.

6. A computer program product executable by a computer system for performing the method of claim 5.

7. A computer system for determining if a window may become the foreground window on a computer controlled display, said system comprising:

a processor;

a memory;

a display device;

a user interface device; and a computer program stored in the memory and executed by the processor comprises:

a process right component for determining if an initiated process has the right for its window to become the foreground window;

a process request component for determining if the window associated with a process can take the foreground based on a set of predetermined process foreground rules and if the right was given with respect to the initiated process;

a thread right component for determining if an initiated thread has a right for its window to become the foreground window; and a thread request component for determining what window displayed or to be displayed is in the foreground when a thread requests for its associated window to take the foreground based on a set of predetermined thread foreground rules and if the right was given with respect to the initiated thread.

8. The system of claim 7, wherein the determining if an initiated process has the right for its window to become the foreground window further comprises:

granting the right to the initiated process if:
no input has been generated for another process during initialization of the initiated process; and
the window associated with the process that created the initiated process or any process in a chain of parent processes from the initiated process can take the foreground based on predetermined process foreground rules.

9. The system of claim 8, wherein the window associated with a process can take the foreground based on the predetermined process foreground rules if:

the process owns the thread that received the last input;

the process owns the thread that is associated with the window that is in the foreground;

the special right has been granted with respect to the process;

no window associated with another process is in the foreground; or if a window associated with another process is in the foreground, the process that received the last input is being debugged, the process in the foreground is being debugged, or a preset time-out limit has expired for the process in the foreground.

10. The system of claim 7, wherein the determining if an initiated thread has the right for its window to become the foreground window further comprises:

granting the right with respect to a thread if:
the right was not granted with respect to the thread's process; and
the window associated with the thread's process is in the foreground or the thread's process received the last input.

11. The system of claim 10, wherein the predetermined thread foreground rules allow the window associated with a thread to take the foreground if:

there are no windows associated with threads in the menu mode; and the thread is a system thread, the special right was granted with respect to the thread or the window associated with the thread's process can take the foreground.

* * * * *

UNITED STATES PATENT AND TRADEMARK OFFICE
CERTIFICATE OF CORRECTION

PATENT NO. : 6,005,575
DATED : December 21, 1999
INVENTOR(S) : J. D. Colleran et al.

It is certified that error appears in the above-identified patent and that said Letters Patent is hereby corrected as shown below:

Column 1,
Line 49, "users'input" should read -- user's input --

Column 2,
Line 38, after "foreground window" "," should read -- ; --
Line 46, after "positive if" insert -- : --
Line 56, "if" should read -- if: --

Column 3,
Line 50, after "etc." insert -- , --

Column 4,
Line 13, after "writing" insert --to--
Line 15, "disk drive 30," should read -- disk 31, --

Column 5,
Line 2, "person computer" should read -- personal computer --
Line 31, "sub-process or thread." should read -- sub-processes or threads. --
Line 43, "thread's" should read -- threads' --
Line 44, "thread's" should read -- threads' --
Line 56, "The set of rules and when the rules are analyzed to provide" should read -- The set of rules is analyzed to provide --

Column 6,
Line 62, after "another window" delete " is performed"

Column 7,
Line 7, before "parent" insert -- a --
Line 44, "was determined" should read -- has determined --

Column 8,
Line 51, "threads" should read -- thread's --
Line 63, "254,." should read -- 254.--

UNITED STATES PATENT AND TRADEMARK OFFICE
CERTIFICATE OF CORRECTION

PATENT NO.   : 6,005,575
DATED        : December 21, 1999
INVENTOR(S)  : J. D. Colleran et al.

It is certified that error appears in the above-identified patent and that said Letters Patent is hereby corrected as shown below:

Column 9,
Line 3, before "take" delete "to"
Line 7, before "thread" insert -- the --
Line 15, before "whether" delete "of"

Column 10,
Line 10, after "window" delete "to"
Line 18, before "word processing" insert -- the --
Line 23, before "word processing" insert -- the --
Line 25, after "associated" insert -- with --
Line 47, "Wmdow" should read -- Window --

Column 11,
Line 1, after "with" insert -- the --
Line 39, after "programs," delete "that"

Column 12,
Line 67, (Claim 7, line 9) after "processor" insert --, which --

Signed and Sealed this

Twenty-third Day of October, 2001

*Attest:*

*Attesting Officer*

NICHOLAS P. GODICI
*Acting Director of the United States Patent and Trademark Office*